3,157,512
STABILIZATION OF ANIMAL AND POULTRY
FEEDS CONTAINING ANTIBIOTICS
Siegfried Arthur Muller, Closter, N.Y., assignor to American Cyanamid Company, Stamford, Conn., a corporation of Maine
No Drawing. Original application June 22, 1960, Ser. No. 37,853. Divided and this application Dec. 1, 1961, Ser. No. 157,868
10 Claims. (Cl. 99—9)

This invention relates to the stabilization of animal and poultry feed supplements and to animal and poultry feeds containing a tetracycline type antibiotic and more particularly is concerned with a novel process of preparing animal feed supplements and/or animal feeds which are stable upon prolonged storage against loss of antibiotic potency.

In recent years the use of antibiotics in animal feeds for improving growth characteristics and efficiency of feed utilization has become of considerable economic importance. One of the best of such procedures is described in the United States patent to Jukes, No. 2,619,420, which involves the addition to animal feeds of the antibiotics produced by fermentation of an aqueous nutrient medium with the microorganism *Streptomyces aureofaciens*. In practice, the fermentation mash solids are harvested, after the fermentation has been continued for the requisite length of time, and dried. The dried harvest mash solids containing the antibiotics produced by the microorganism *Streptomyces aureofaciens* can be used as such an animal feed supplement or they may be blended with conventional animal feed materials to produce a nutritionally-balanced growth accelerating animal feed.

The use of the dried chlortetracycline-containing fermentation harvest mash solids as an animal or poultry feed supplement has from the beginning presented very vexing problems particularly the loss of potency of the antibiotic in the feed or feed supplement upon prolonged storage. This loss of antibiotic potency, and which frequently runs as high as 20% over a one-year storage period, has heretofore necessitated the addition of a suitable overage of dried harvest mash antibiotic-containing solids to the animal feed blend so as to maintain the antibiotic potency during storage. Such a procedure is unsatisfactory and among other things results in higher than desired manufacturing costs for these animal feed supplements.

In commercial practice, a typical procedure for obtaining the dried harvest mash-antibiotic-containing solids is carried out by harvesting the fermentation mash at the prevailing pH, that is about pH 6-8. A filter aid such as diatomaceous earth is then added and the solids are collected by filtration and dried. The dried filter cake containing from 1-50 grams of chlortetracycline per pound may be marketed as such or may be blended with conventional poultry or animal feed materials to produce a nutritionally-balanced growth accelerating antibiotic-containing animal feed.

The present invention is based upon the surprising discovery that instead of harvesting and drying the fermentation mash at the weakly alkaline pH of about 6-8, if the mash is first acidified to a pH of about 0.1-3 and then readjusted upward to an alkaline pH of around 8.5-13, the dried mash solids are stabilized against loss of antibiotic potency upon storage for prolonged periods of time. It is not known with any degree of certainty the reason why the novel "down-up" process of this invention results in the stabilization of the harvest mash solids to such a considerable extent but it is believed that it involves the formation of a calcium-antibiotic-carrier complex of some sort which requires acid conditions. In any event, the resulting dried mash solids are remarkably stable towards loss in antibiotic potencies.

It has been determined that the optimum acid pH is about 2 or lower and the necessary or minimum upper pH is around 8.5 or slightly higher. Specific hydrogen ion concentrations vary slightly with different tetracyclines. For example, with chlortetracycline a pH of 8.4 has been found to result in enhanced stability. For tetracycline a pH of 9.0 has been found to be best while with oxytetracycline a pH of 9.5 produces optimum results. With demethylchlortetracycline a pH of 8.7 has proven satisfactory.

The particular acid employed to lower the pH of the fermentation harvest mash to the desired level is a factor of some importance. While, in general, any mineral acid may be used, best results are obtained when hydrochloric acid or sulfuric acid is used. This may be because certain acids such as phosphoric acid have a tendency to remove calcium from the mash and which seems to be at least in part responsible for the desirable results obtained by the process of this invention.

In carrying out the present invention the fermentation harvest mash, and which at harvest usually has a pH varying from about 6.5 to 7.5, is first adjusted downward to a pH of around 2 or lower with hydrochloric acid or sulfuric acid. A short time later, for example, 2-5 minutes, with stirring, the mash is adjusted upward with caustic such as an alkali metal hydroxide or alkaline earth metal hydroxide to a pH of around 8.5-13 depending upon the particular antibiotic contained in the mash. The alkaline mash is then slurried with 2-4% (w./v.) of diatomaceous earth and if desired with 0.2% of a synthetic hydrated magnesium silicate such as magnesol which has the approximate composition

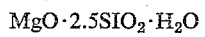
$$MgO \cdot 2.5SIO_2 \cdot H_2O$$

The slurry is then filtered and the filter cake dried at a temperature ranging from about 25° to about 110° C. and the moisture content is adjusted to a range of from 5% to 20%.

It has been found that when samples of the dried harvest mash solids obtained by the novel process of this invention are assayed for antibiotic potency after storage at 56° C. for one week, the average loss in potency is only 6% whereas standard production material and obtained by the commercial process hereinbefore-described shows an average loss of antibiotic potency of 24%.

While the process of this invention results in a considerable improvement in stability of the feed supplement, that is, the dried harvest mash solids containing from 1-50 grams of antibiotic per pound, and which makes it possible for the first time to store these feed supplements for extended periods of time without appreciable loss in antibiotic potency, nevertheless, when the feed supplement is blended with conventional poultry feed materials it has been found that there is a distinct loss in antibiotic potency of the finished feed upon storage for prolonged periods of time.

It has been discovered that this loss in antibiotic potency of the finished feed can be prevented by the addition of mild caustic, preferably calcium hydroxide, to the finished feed in a quantity sufficient to raise and maintain the pH to between 6 and 12 and preferably 8.5–11.5. The combination treatment of this invention results in the stabilization of the feed supplement so that it is stable upon storage and when this treated feed supplement is blended with conventional poultry feed materials the finished feed can likewise be stabilized by the described treatment with calcium hydroxide.

The invention will be described in greater detail in conjunction with the following specific examples.

*Example 1*

A 1-liter portion of harvest mash obtained as a result of *Streptomyces aureofaciens* strain A–377 fermentation for 120 hours at 28° C. was adjusted to pH 7.2 with 15 N sodium hydroxide solution. A 20-gram quantity of diatomaceous earth filter-aid and a 2-gram quantity of magnesium silicate were added. The slurry was stirred for 10 minutes, then filtered. The filter cake was air-dried overnight to a volatiles content of 8.5%. This product assayed 92 mcg. of chlortetracycline per milligram of solids by microbiological assay. After standing in a tightly-capped jar at 56° C. for 7 days, the product assayed 65 mcg./mg., a loss of 26% of the original activity.

Another 1-liter portion of this harvest mash was adjusted to pH 1.7 by the addition of concentrated hydrochloric acid. A 20-gram quantity of diatomaceous earth filter-aid and 2 grams of magnesium silicate were added and the slurry stirred. After 5 minutes of stirring, 15 N sodium hydroxide solution was used to adjust the pH to 8.4. The slurry was filtered and the filter cake dried to a volatiles content of 7.8%. This cake assayed 90.5 mcg. of chlortetracycline per milligram of solids. After being kept 7 days in a tightly-capped jar at 56° C., this product assayed 89 mcg./mg.; a loss of only 1.7% of the original activity as compared to the 26% loss in the control.

*Example 2*

A 1-liter portion of chlortetracycline-containing 120-hour at 28° C. harvest mash was adjusted to pH 7.3 with 0.6 milliliter of 15 N sodium hydroxide solution. A 20-gram quantity of diatomaceous earth filter-aid was added and the resulting slurry stirred for 10 minutes, then filtered. The filter cake was air-dried overnight. The volatiles content of the cake was 7.5%, and it assayed 78.5 mcg. of chlortetracycline per mg. of solids. After standing in a tightly-capped jar at 56° C. for 7 days, it assayed 60 mcg./mg., for a loss of 23% of the starting potency.

Another 1-liter portion of the same mash was adjusted to pH 1.4 with sulfuric acid, stirred five minutes, and then adjusted to pH 8.4 with 15 N sodium hydroxide solution. The same quantity of diatomaceous earth was added as before. Filtration and drying produced a cake having 8.4% volatile matter. This cake assayed 73 mcg./mg. before standing at 56° C. for 7 days and 71.5 mcg./mg. afterwards, for a loss of 2.1% of the original activity as compared to the 23% loss in the control.

*Example 3*

Three 1-liter portions of a 120-hour (28° C.) tetracycline-containing fermentation harvest mash were treated as follows:

(a) A 1-liter portion was adjusted to pH 7.6 with sodium hydroxide solution, slurried with 40 grams of diatomaceous earth filter-aid and 2 grams of magnesium silicate, stirred, and filtered. The filter cake was air-dried and adjusted to a moisture content of 8.5%.

(b) A second 1-liter portion was adjusted to pH 10.0 with sodium hydroxide, slurried with 40 grams of diatomaceous earth filter-aid and 2 grams of magnesium silicate, stirred, and filtered. The filter cake was air-dried and adjusted to a moisture content of 8.5%.

(c) A third 1-liter portion was adjusted to pH 1.5 with hydrochloric acid, then adjusted to pH 9.0 with sodium hydroxide solution, slurried with 40 grams of diatomaceous earth filter-aid and 2 grams of magnesium silicate, stirred and filtered. The filter cake was air-dried and adjusted to a moisture content of 8.5%.

All three filter cakes were assayed (microbiologically) for tetracycline content, allowed to stand for 7 days at 56° C. in tightly-capped jars, then assayed again (microbiologically) to determine potency losses, with the following results.

| Treatment: | Loss in potency in 7 days at 56° C., percent |
|---|---|
| (a) pH 7.6 | 26 |
| (b) pH 10.0 | 25 |
| (c) pH 2.0 to pH 9.0 | 7 |

*Example 4*

Three 1-liter portions of a120 hour (28° C.) oxytetracycline-containing fermentation harvest mash were treated as follows:

(a) A 1-liter portion was adjusted to pH 7.6 with sodium hydroxide solution, slurried with 40 grams of diatomaceous earth and 2 grams of magnesium silicate, stirred, and filtered. The filter cake was air-dried and adjusted to a moisture content of 8.5%.

(b) A second 1-liter portion was adjusted to pH 9.5 with sodium hydroxide solution, surried with 40 grams of diatomaceous earth and 2 grams of magnesium silicate, stirred and filtered. The filter cake was air-dried and adjusted to a moisture content of 8.5%.

(c) A third 1-liter portion was adjusted to pH 2.0 with hydrochloric acid, then adjusted to pH 9.5 with sodium hydroxide solution slurried with 40 grams of diatomaceous earth and 2 grams of magnesium silicate, stirred and filtered. The filter cake was air-dried and adjusted to a moisture content of 8.5%.

At three filter cakes were assayed, allowed to stand for 7 days at 56° C. in tightly-capped jars, then assayed again (plate assay method) to determine potency losses, with the following results.

| Treatment: | Loss in potency in 7 days at 56° C., percent |
|---|---|
| (a) pH 7.6 | 33 |
| (b) pH 9.5 | 55 |
| (c) pH 2.0–pH 9.5 | 9 |

*Example 5*

Two 1-liter portions of a 120-hour (28° C.) demethylchlortetracycline - containing fermentation harvest mash were treated as follows:

(a) A 1-liter portion was adjusted to pH 7.6 with sodium hydroxide solution, slurried with 30 grams of diatomaceous earth, and filtered. The filter cake was dried and its moisture content then adjusted to 8.5%.

(b) A second 1-liter portion was adjusted to pH 1.9 with hydrochloric acid solution then, within 5 minutes, adjusted to pH 8.7 with sodium hydroxide solution and slurried with 30 grams of diatomaceous earth. The slurry was filtered and the filter cake thus obtained was dried as above. Subsequently, the moisture content of the dried filter cake was adjusted to 8.5%.

Both filter cakes were assayed for demethylchlortetracycline content, allowed to stand for 7 days at 56° C. in tightly-capped jars, then assayed to determine potency losses. Test results were as follows.

| Treatment: | Loss in potency in 7 days at 56° C., percent |
|---|---|
| (a) pH 7.6 | 15 |
| (b) pH 1.9–pH 8.7 | 6 |

*Example 6*

Feed supplements were prepared as in Example 1, using both the conventional procedure and the process of the present invention to obtain chlortetracycline-containing harvest mash solids having moisture contents of about 17%. These two types of solids were assayed for chlortetracycline content, held at 56° C. in tightly-closed containers for 7 days and again assayed. The test results were as follows:

| Feed Supplement Type | Treatment | Initial Assay for CTC, mcg./g. | Loss in Potency at 56° C. for 7 days, percent |
|---|---|---|---|
| Conventional | pH 7.2 | 444 | 22.6 |
| New Process | pH 1.7–pH 8.4 | 479 | 3.5 |

Then chick feeds were prepared; using the conventional procedure solids and new process solids as ingredients; in the proportions of 100 grams of standard chick feed and 0.5 gram of solide. The standard chick feed consisted of 65% yellow corn, 20% soybean oil meal, 5% corn gluten meal, 5% fish meal, 2% alfalfa meal, 1.5% steamed bone meal, 2% calcite, and a miscellaneous group of essential materials such as minerals, vitamins, and the like. These two types of feeds were assayed for chlortetracycline content then kept at 10% moisture and 56° C. for 7 days in tightly-closed containers and again assayed with the following results.

Feed intermediate type:    Loss in potency at 56° C. for 7 days, percent
Conventional _____ 23
New Process _____ 21

Finally, chick feeds were prepared using the following proportions:

G.
(a) Standard chick feed _____ 100.0
     Ca(OH)$_2$ _____ 2.0
     Conventional procedure solids _____ 0.5
(b) Standard chick feed _____ 100.0
     Ca(OH)$_2$ _____ 2.0
     New process solids _____ 0.5 and thus maintaining, by means of the Ca(OH)$_2$ a pH of 9.0 in the final chick feed blends. Both blends were kept at 10% moisture and 56° C. for 7 days in tightly-closed containers; with the following results.

Feed type:    Loss in potency at 56° C. for 7 days, percent
Conventional _____ 26
New process _____ 2

*Example 7*

Feed supplements were prepared as in Example 1, using both the conventional procedure and the process of the present invention to obtain chlortetracycline-containing harvest mash solids having moisture contents of about 17%.

Then animal feeds were prepared, using the conventional procedure solids and new process solids as ingredients, in 1:1 proportions with soybean feed containing 1.5% lard oil. The moisture content of both the animal feed blend containing conventional procedure solids and the animal feed blend containing the new process solids was 10%. These two feed blends were assayed for chlortetracycline content, held at 56° C. for 7 days in tightly-closed containers, and again assayed. Test results were as follows.

Feed type:    Loss in potency at 56° C. for 7 days, percent
Conventional _____ 13
New Process _____ 3

*Example 8*

The addition of 5% dry calcium hydroxide to harvest mash solids (feed supplements prepared in accordance with the present invention) was carried out in a number of runs. The results obtained are shown in the table below.

| Percent Recovery 49 Days, 56° C. (Control) | Percent Recovery 49 Days, 56° C. |
|---|---|
| 82.5 | 98.5 |
| 82 | 97 |
| 79 | 92.5 |
| 91 | 96.5 |
| 92.5 | 103.0 |
| 99.0 | 94.5 |
| 101.0 | 96.0 |
| 86.0 | 92.0 |
| 88 | 98 |
| 61.5 | 81 |
| 71.5 | 91 |
| 69.5 | 87 |
| 73 | 84 |
| 54 | 88.5 |
| 65.5 | 98 |
| 59 | 104 |
| 87 | 87 |
| 89.5 | 87 |
| 40 | 90 |
| 83.5 | 87.5 |
| 69.3 | 82 |
| 65.1 | 77 |
| 79 | 78 |
| 57.2 | 85.5 |
| 79.7 | 89 |
| 63 | 86 |
| 65.5 | 79 |
| 72.4 | 82 |
| 76.4 | 92 |
| 72.6 | 82 |

It will be seen that there is an average of a 25% loss in potency in the control and only a 10% loss in the samples treated with calcium hydroxide.

I claim:
1. A process for the production of dried fermentation harvest mash solids containing a tetracycline antibiotic which comprises adjsting the pH of the harvest mash to a pH of around 0.1–3 with a mineral acid raising the pH of the acidulated harvest mash to a pH of around 8.5–13 and thereafter filtering and drying the harvest mash so as to stabilize the mash solids against loss in antibiotic potency.

2. A process for the production of dried fermentation harvest mesh solids containing a tetracycline antibiotic which comprises adjusting the pH of the harvest mash to a pH of around 0.1–3 with an acid of the group consisting of hydrochloric acid and sulfuric acid, raising the pH of the acidulated harvest mash to a pH of around 8.5–13 with caustic and thereafter filtering and drying the harvest mash so as to stabilize the mash solids against loss in antibiotic potency.

3. A process according to claim 2 in which the tetracycline antibiotic is chlortetracycline.

4. A process according to claim 2 in which the tetracycline antibiotic is tetracycline.

5. A process according to claim 2 in which the tetracycline antibiotic is oxytetracycline.

6. A process according to claim 2 in which the tetracycline antibiotic is demethylchlortetracycline.

7. A process according to claim 2 in which the tetracycline antibiotic is demethyltetracycline.

8. A process for the production of an animal feed composition which comprises adjusting the pH of a fermentation harvest mash containing the growth-promoting factors produced by elaboration of a microorganism of the group consisting of *Streptomyces aureofaciens* and *Streptomyces rimosus* to a pH of around 0.1–3, raising the pH of the acidulated harvest mash to a pH of around 8.5–13, thereafter filtering and drying the harvest mash solids to produce an animal feed supplement, adding to said animal feed supplement a major amount of an edible animal feedstuff and sufficient mild caustic so as to maintain the pH of the animal feed between pH 6–12 whereby the animal feed is stabilized against losses in antibiotic potency for extended periods of time.

9. A process according to claim 8 in which the caustic is calcium hydroxide.

10. A process for the production of an animal feed composition which comprises adjusting the pH of a fermentation harvest mash containing chlortetracycline to a pH of around 0.1–3, raising the pH of the acidulated harvest mash to a pH of around 8.5–13, thereafter filtering and drying the harvest mash solids to produce an animal feed supplement, adding to said animal feed supplement a major amount of an edible animal feedstuff and calcium hydroxide so as to maintain the pH between pH 6–12 whereby the animal feed is stabilized against losses in antibiotic potency for extended periods of time.

References Cited in the file of this patent
UNITED STATES PATENTS

| | | |
|---|---|---|
| 2,619,420 | Jukes | Nov. 25, 1952 |
| 2,962,378 | Hutanen et al. | Nov. 29, 1960 |
| 2,970,946 | Chertow | Feb. 7, 1961 |
| 2,970,947 | McCormick | Feb. 7, 1961 |
| 3,019,109 | Klothen | Jan. 30, 1962 |